United States Patent
St-Germain

(10) Patent No.: US 7,107,625 B2
(45) Date of Patent: Sep. 19, 2006

(54) HEADGEAR WITH ENCLOSURE FOR AN INSECT SCREEN

(76) Inventor: Gilles St-Germain, 120 Elmire, Montreal, QBC (CA) H2T 1J8

( * ) Notice: Subject to any disclaimer, the term of this patent is extended or adjusted under 35 U.S.C. 154(b) by 0 days.

(21) Appl. No.: 10/940,666

(22) Filed: Sep. 15, 2004

(65) Prior Publication Data
US 2006/0005300 A1    Jan. 12, 2006

Related U.S. Application Data

(63) Continuation-in-part of application No. 10/884,993, filed on Jul. 7, 2004, now abandoned.

(51) Int. Cl.
*A42B 1/24* (2006.01)
(52) U.S. Cl. ...................... 2/209.13; 2/184.5
(58) Field of Classification Search .. 2/209.11–209.13, 2/206, 207, 184.5, 175.6
See application file for complete search history.

(56) References Cited

U.S. PATENT DOCUMENTS

| 336,712 | A | | 2/1886 | Garst |
| 499,965 | A | | 6/1893 | Bushnell |
| 1,359,393 | A | * | 11/1920 | Leak et al. ................. 2/4 |
| 1,635,916 | A | * | 7/1927 | Williams ................... 2/46 |
| 1,780,801 | A | | 11/1930 | Shlenker |
| 2,295,826 | A | * | 9/1942 | Brav ....................... 2/172 |
| 2,472,033 | A | | 5/1949 | Wetzel |
| 3,505,682 | A | * | 4/1970 | Mims ...................... 2/171.1 |
| 4,214,318 | A | | 7/1980 | Gomez |
| 4,397,044 | A | | 8/1983 | Trepanier |
| 5,091,993 | A | | 3/1992 | Merrill et al. |
| D346,893 | S | | 5/1994 | St-Germain |
| 5,367,706 | A | | 11/1994 | Davidson |
| 5,459,881 | A | * | 10/1995 | Fagan et al. ............... 2/209.13 |
| D367,549 | S | | 2/1996 | Deziel |
| 5,539,929 | A | | 7/1996 | Revson |
| 5,577,271 | A | | 11/1996 | Davis |
| 5,713,076 | A | | 2/1998 | Davis |
| 5,713,077 | A | | 2/1998 | Humbrecht |
| 5,790,986 | A | | 8/1998 | Hall |
| 5,933,871 | A | | 8/1999 | Kraft |
| 6,049,904 | A | | 4/2000 | Siracusa |
| 6,131,201 | A | | 10/2000 | Chu |
| 6,230,331 | B1 | | 5/2001 | Aguilar et al. |
| 6,233,738 | B1 | | 5/2001 | Siracusa |
| 6,317,892 | B1 | | 11/2001 | Galigani |

* cited by examiner

*Primary Examiner*—Katherine M. Moran
(74) *Attorney, Agent, or Firm*—Equinox Int'l; Franz Bonsang, Patent Agent

(57) ABSTRACT

A hat with enclosure for an insect screen has a generally planar top section and at least a first fabric member. The top section has a top edge and the first fabric member has a first edge and a second free edge. The first edge is connected to a portion of the top edge. The second edge is adjacent another portion of the top edge to define a closable opening there between. The fabric member and the top section define an enclosure that covers substantially entirely the top section. The insect screen has a portion connectable to either the top section or the fabric member adjacent the closable opening and is selectively insertable into the enclosure and deployable therefrom to cover a user's head. Preferably, the top section is partially covered by a second fabric member that also forms the enclosure.

20 Claims, 4 Drawing Sheets

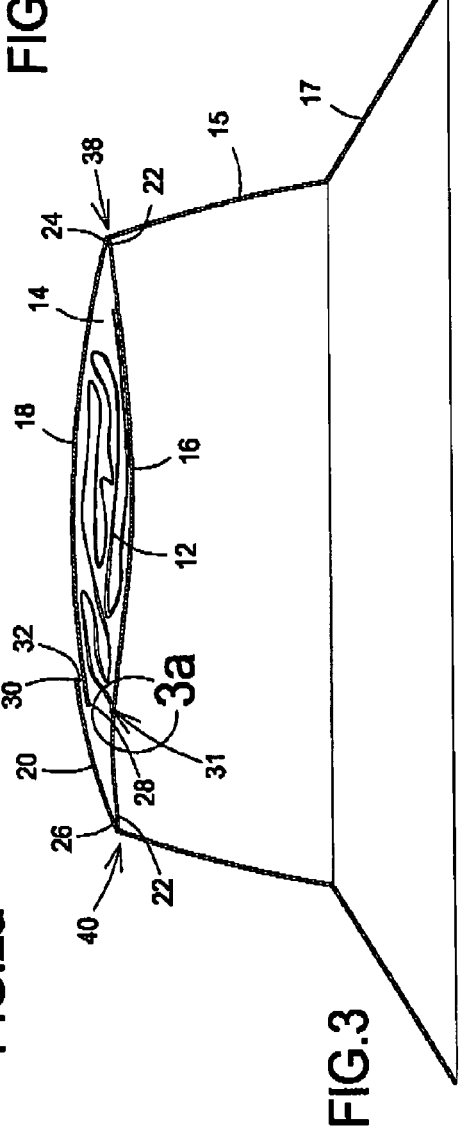
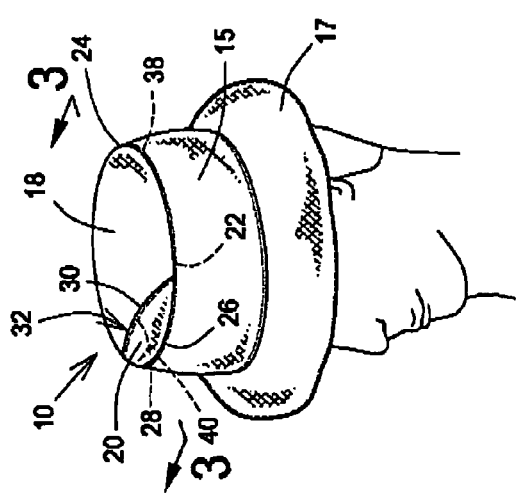
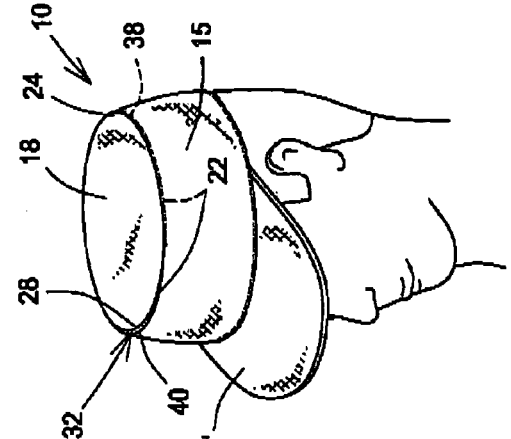
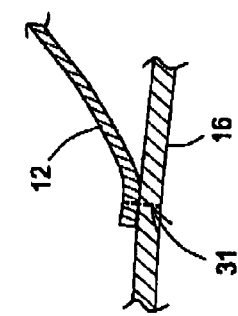
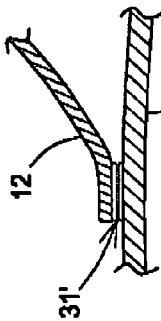
FIG. 2a
FIG. 2b
FIG. 3
FIG. 3a
FIG. 3b

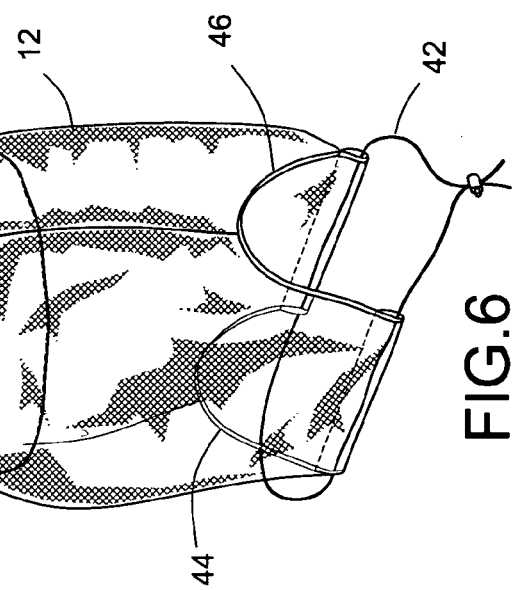
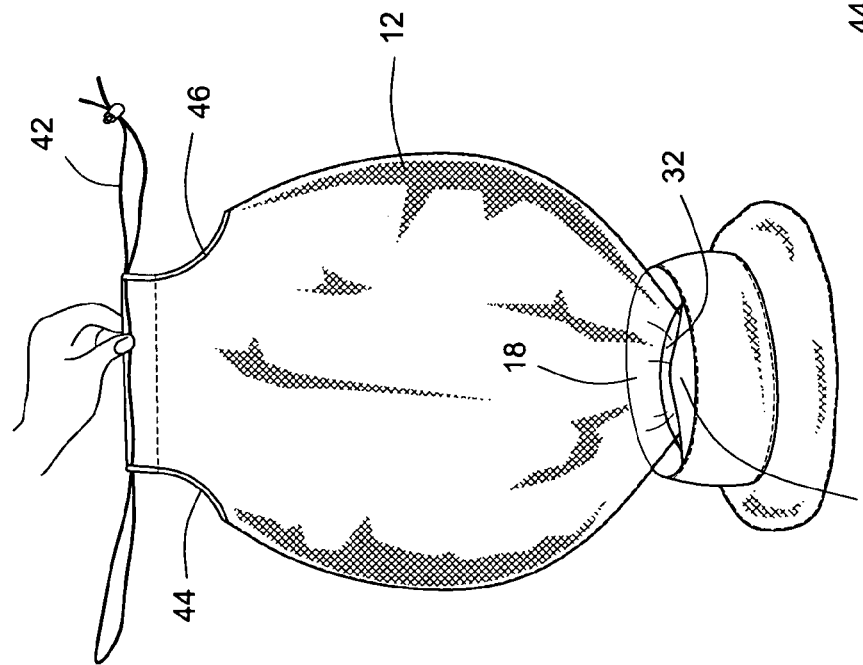
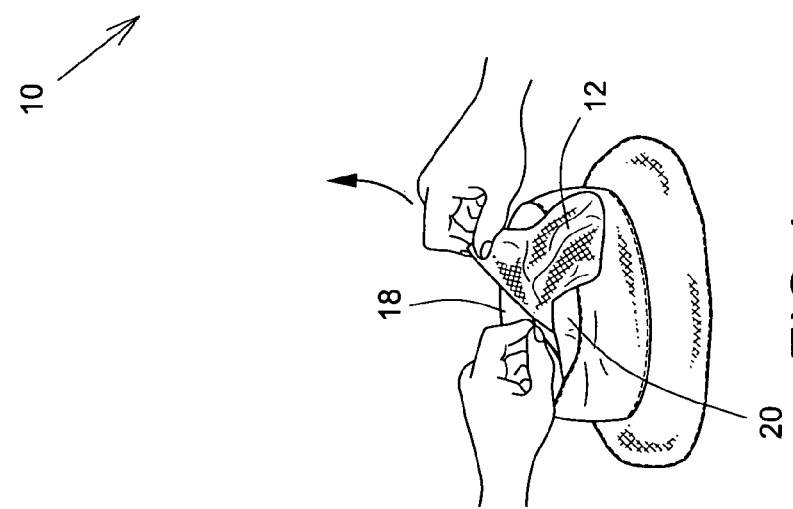

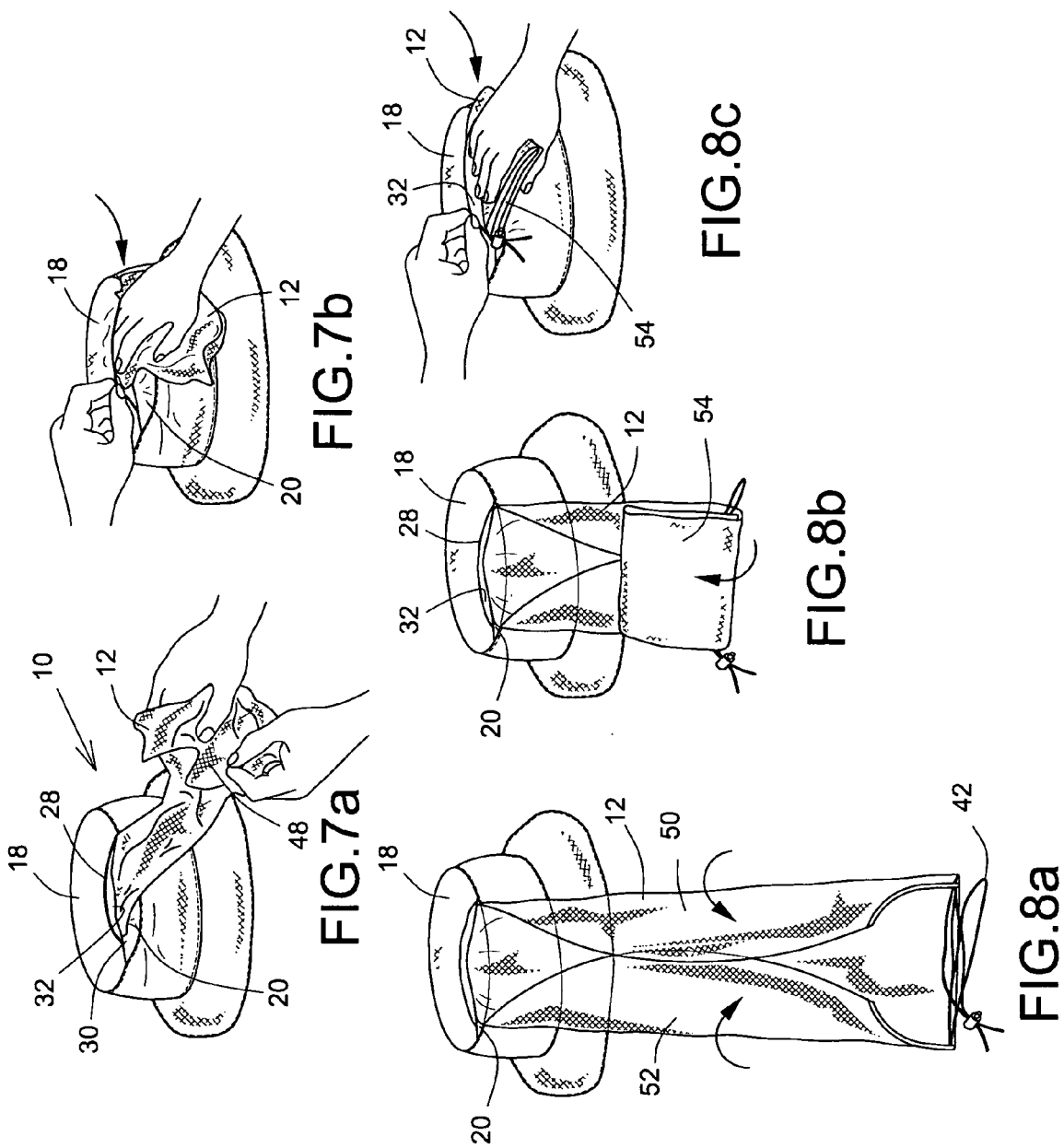

HEADGEAR WITH ENCLOSURE FOR AN INSECT SCREEN

CROSS REFERENCE TO RELATED APPLICATIONS

This application is a continuation-in-part (C.I.P.) of application Ser. No. 10/884,993, filed on Jul. 7, 2004 abandoned.

FIELD OF THE INVENTION

The present invention concerns protective headgear and more particularly headgear with enclosure for an insect screen.

BACKGROUND OF THE INVENTION

Flying and biting insects, such as mosquitoes and the like, are nuisance during recreational activities outdoors because of the bites they inflict on exposed skin. A person's hair may entangle the insects and more seriously, the person's eyes may trap the insects. In areas where malaria is prevalent, the presence of mosquitoes can be a serious health risk to humans. Protective clothing or avoidance of insect-infested area is often the practical remedy to reduce exposure. Anti-insect clothing is well known and widely used, and may include specially designed overalls and headgear. Specially designed headgear, in the form of hats, is often used with other pieces of protective and includes an anti-insect screen connected to a part of the hat, often near the brim which would, among others, force any broidery to be made at an early stage of the manufacturing thereof, at least before installation of the screen. In some designs, the screen is rolled up and held exterior of the hat using a strip of fabric, which is held in place using a snap button. In this case, it is usually time consuming to roll up the screen and squeezing it tightly in place within an elongated narrow pocket or the like prior to snapping the button. Other elaborate and usually small containment systems have also been designed that include zippers, which may damage the screen that might have a tendency to naturally come out therefrom, and often require extensive modification of the hat, which may be prohibitively expensive for mass production. Furthermore, some designs locate the insect screen around the periphery of brim of the hat, which may be aesthetically unpleasing and may reduce visibility if large screens are employed.

This there is a need for an improved hat with enclosure for an insect screen.

SUMMARY OF THE INVENTION

The present invention reduces the difficulties and disadvantages of the prior art by providing a hat with an enclosure for an insect screen, which is deployable from the hat, such as those commonly used in outdoor recreational activities. The simple enclosure eliminates the need for buttons are press-studs by providing a simple envelope of at least one piece of fabric connected to the top section of the hat. The envelope easily permits the user to loosely fit, such as by stuffing or folding, the insect screen thereinto. Advantageously, the envelope is integral with the hat and provides an unobtrusive, aesthetically pleasing means for keeping the screen essentially invisible when in an undeployed configuration. The screen is located within the top portion of the hat away from brim and thus accidental deployment or reduction in visibility around the user's field of vision is significantly reduced. This location further leaves the front portion of the crown of the hat free for advertising or other type of broidery to be made after the manufacturing thereof. Moreover, complicated folding and manipulation of container components are essentially eliminated. The enclosure provides protection to the insect screen, which may otherwise be prone to damage. The discrete envelope gives the impression of a regular hat. The envelope uses inexpensive and readily available materials and is easy to manufacture. Typically, the insect screen is connectable to the hat inside the enclosure not only to prevent its possible lost but also to ensure a proper position thereof for its deployment and its use.

According to an aspect of the present invention, there is provided a hat for that comprises: a generally planar top section, the hat section having top edge thereof; a fabric member having a first edge and a second free edge extending from the first edge and forming an outer perimeter of the fabric member therewith, the first edge connecting to a first portion of the top edge and defining a complementary second portion thereof unconnected to the fabric member, the second free edge being adjacent the second portion of the top edge and defining a closable opening between the second portion of the top edge and the second free edged, the fabric member and the top section defining an enclosure covering substantially entirely the top section; and an insect screen having a portion connectable to the top section or to the fabric member adjacent the closable opening, the insect screen being selectively insertable into the enclosure and deployable therefrom to cover a user's head.

Typically, the insect screen is stuffable or foldable into the enclosure and deployable therefrom to cover the user's head.

Typically, the insect screen is anti-mosquito netting.

In one embodiment, the insect screen is releasably connected to the top section or to the fabric member adjacent the closable opening.

In one embodiment, the insect screen is stitched to the top section or to the fabric member adjacent the closable opening.

Typically, the top section is generally elliptical.

In one embodiment, the fabric member is a first fabric member, the hat further includes: a second fabric member having a third edge and a fourth free edge, said third edge connecting to the second portion of the top edge, the second and fourth free edges being adjacent to one another and defining the closable opening therebetween, the first and second fabric members and the top section together defining the enclosure; the insect screen having a portion connectable to the top section, to the first fabric member or to the second fabric member adjacent the closable opening.

Typically, the top edge of the top section is circumferentially disposed, with the first edge of the first fabric member being arcuate and sewn to a rear portion thereof and the third edge of the second fabric member being arcuate and sewn to a front portion thereof.

Typically, the first fabric member is larger than the second fabric member, the first fabric member and the top section defining a first enclosure part larger than a second enclosure part defined by the second fabric member and the top section, the insect screen being substantially insertable into the first enclosure part.

In one embodiment, the second and fourth free edges are overlapping edges so as to close the opening therebetween.

Typically, the fourth edge overlaps the second edge, the first and second fabric members being generally disposed flat against the top section.

In one embodiment, the hat further includes a brim extending substantially radially all around a user's head, the brim being coverable by the insect screen when the screen covers the user's head.

BRIEF DESCRIPTION OF THE DRAWINGS

Further aspects and advantages of the present invention will become better understood with reference to the description in association with the following FIGS. in which:

FIG. 2a is a perspective view of the hat with the insect screen fully contained;

FIG. 2b is a perspective view of a military-type cap with an enclosure for an insect screen in accordance with another embodiment of the present invention;

FIG. 3 is a cross sectional view taken along lines 3—3 of FIG. 2a;

FIG. 3a is an enlarged broken section view taken along line 3a of FIG. 3, showing connection of insect screen to top screen of hat with stitching;

FIG. 3b is a view similar to FIG. 3a, showing connection of screen to top section of hat with Velcro™;

FIG. 4 is a simplified perspective view of the insect screen being deployed by a user;

FIG. 5 is a simplified perspective view of the insect screen fully extended from the enclosure;

FIG. 6 is a simplified perspective view of the deployed insect screen showing a drawstring;

FIGS. 7a and 7b illustrate a sequence of stuffing the insect screen into the enclosure; and FIGS. 8a through 8c illustrate an alternative sequence of folding the insect screen into the enclosure.

DETAILED DESCRIPTION OF THE PREFERRED EMBODIMENTS

Figure 1:
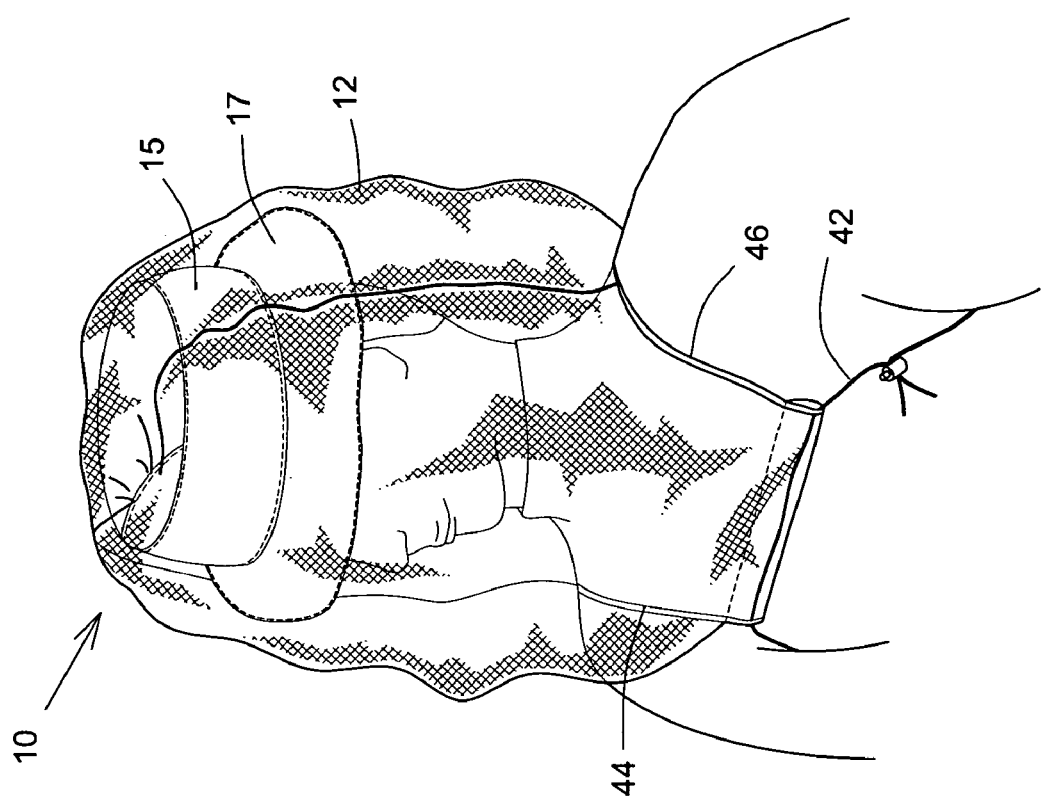
FIG. 1 is a simplified perspective view of a hat with an enclosure for an insect screen in accordance with an embodiment of the present invention, showing the insect screen deployed from an enclosure of the hat.

Referring now to FIG. 1, there is illustrated a hat 10 with an enclosure 14 for containment of an insect screen 12 in accordance with an embodiment of the present invention as part of a hat 10. The hat 10 typically includes a generally cylindrical crown 15 and a generally planar and elliptical closing top section 16 (see FIG. 3) connected (generally sewn) to an upper portion thereof. A brim 17 extends generally radially outwardly from a lower portion of the crown 15, over at least a section of its circumference. Typically, the hat 10 is the sports type such as used during outdoor recreational activities in areas of high insect population. Although the hat may be a soft type hat with a soft or stiff brim 17 extending over the entire circumference thereof, or may be a military-type cap with a stiff brim 17' located at the front portion of the cap, as illustrated in FIGS. 2a and 2b respectively, the soft type hat is preferred since its brim extends substantially radially and all around the user's head to improve protection of the screen 12 at other areas than the user's face such as the ears, back and side portions of the neck by forcing the screen 12 to remain away therefrom. In the embodiment illustrated, the insect screen 12 is typically an anti-mosquito netting. Many types of anti-mosquito netting or mesh are currently available including, for example the one made out of Nylon™ and polyester. Typically, the netting is slightly rigid, either by the material itself or by the use of an agent coated thereon or by impregnation therein to prevent the netting from following the contour of the covered region too closely and keep the insect away therefrom.

Referring now to FIGS. 1, 2a, 2b and 3, broadly speaking the screen enclosure 14 is formed by the top section 16 of the hat 10 and at least one fabric member 18, called hereinafter the first fabric member 18, and preferably a second fabric member 20. In the embodiment illustrated in FIGS. 1, 2a and 3 through 8c, the top section 16 lies adjacent the top region of the wearer's head, which serves to contain the screen 12 when not in use, as shown in FIGS. 2a, 2b and 3. The top section 16 has a top edge 22, which is typically elliptical and circumferentially disposed, although it is to be understood that the shape of the head may vary depending upon the needs of the wearer. The first fabric member 18 has a first edge 24, which is connected to a portion of the edge 22 of the top section 16. The second fabric member 20 has a third edge 26, which is connected to another portion of the edge 22 of the top section 16, the other portion being substantially complementary of the first portion of the top edge 22. The first and second fabric members 18, 20 include respective second and fourth free edges 28, 30, with the second free edge 28 extending from the first edge 24 and forming an outer perimeter of the fabric member therewith. Free edges 28, 30 are adjacent to one another and together define a closable opening 32 therebetween. Typically, the free edges 28, 30 are overlapping edges, the overlap forming the closing of the opening 32. The enclosure 14 then formed by the top section 16 and the fabric members 18, 20 so arranged together is for the insect screen 12 to be insertable therein and covers substantially entirely the top section 16. More specifically, the screen 12 is typically either stuffed or folded into the enclosure 14 so as to substantially fill the whole enclosure 14 to avoid the formation of bulges and the like. The fourth edge 30 overlaps the second edge 28, so that the first and second fabric members 18, 20 are disposed in a flat configuration against the top section 16. It is to be understood that the second edge 28 may overlap the fourth edge 30 and that any other type of closure such as snaps, zippers and the like could be considered without deviating from the scope of the present invention. Since the screen 12 could be prone to damage by most types of closure and for aesthetic reasons, the overlap closure is preferred.

The insect screen 12 is typically connected to the top section 16 and for ease of deployment over the face; the screen 12 is disposed towards the front of the hat 10. Many types of connection may be used including stitching 31, as best shown in FIG. 3a, and the like; in one embodiment, best shown in FIG. 3b, the screen 12 could be releasably connected to the top section 16 using hoop and loop attachment means such as VELCRO™ 31' or the like. The insect screen 12 is typically connected to a portion of the top section 16 at a location adjacent the opening 32. The insect screen 12 is typically stitched at least adjacent a central location of the opening 32 to permit maximum coverage of the face, head and neck of the user. Although not specifically illustrated herein, one skilled in the art would understand that the screen 12 could be connectable to the first or second fabric member 18, 20 adjacent the opening 32 without departing from the scope of the present invention. The connection typically prevents the wearer from inadvertently losing the screen 12 and ensures the proper orientation/position of the screen 12 for its deployment and its use.

The first edge 24 of the first fabric member 18 is arcuate and sewn to a rear portion 38 of the circumferentially disposed edge of the top section 16.

Similarly, the third edge 26 of the second fabric member 20 is arcuate and sewn to a front portion 40 of the circumferentially disposed edge 22 of the top section 16. In the embodiment illustrated, the first fabric member 18 is larger than the second fabric member 20. Accordingly, the first fabric member 18 and the top section 16 together define a first part of the enclosure 14 larger than a second enclosure part defined by the second fabric member 20 and the top section 16. Typically, the insect screen 12, in a contained configuration, is substantially enclosed in the larger part of the enclosure 14, although the flexible nature of the screen material means that the screen 12 may also be housed in the smaller part of the enclosure 14.

As best illustrated in FIGS. 1 and 6, the insect screen 12 useful in the present invention may also include a drawstring 42 and a pair of arcuate shoulder pieces 44, 46. The shoulder pieces 44, 46 lay snugly against the shoulders of the user. The drawstring 42 may be adjusted to tighten or loosen the fit around the lower part of the deployed screen 12 to reduce gaps between the shoulder pieces and the shoulders, thereby stopping insects from breaching the deployed screen 12.

Operation

A typical operation of the hat 10 of the present invention will now described with reference to FIGS. 1, 4, 5, 7a and 7b.

The hat 10 and the screen 12 are typically supplied in the undeployed configuration, as illustrated in FIG. 4. The user separates the overlapping edges 28, 30 and removes the screen 12 by pulling the screen away from the enclosure 14. Once fully deployed, as illustrated in FIGS. 1, 5 and 6, the user may place the hat 10 on his head and then turn the screen 12 inside out over the hat to cover head, face and neck. The arms can then be moved into the areas adjacent the shoulder pieces 44, 46 and the screen drawstring 42 tightened. The deployment may also be achieved before the user places the hat on his head. As best illustrated in FIGS. 7a and 7b, once used, the user may, after untightening the drawstring and moving the screen away from his head, remove the hat 10 from his head. According to one aspect of the present invention, the user crumples the screen into a loose ball and stuffs the screen 12 into the enclosure 14 through the opening 32 between the overlapping edges 28, 30 so that the screen 12 is contained and flattened discreetly away from the user's head. This is advantageous if the user wishes to quickly remove and contain the screen 12 into the enclosure 14.

Alternatively, referring to FIGS. 8a, 8b and 8c, the user may neatly fold the screen 12 along its edges and fold the screen up into a substantially flat packet for insertion into the enclosure 14 through the opening 32 between the two edges 28, 30.

Alternatives

As depicted in FIG. 2a, the enclosure 14 is formed by the top section 16 and the first fabric member 18 that covers substantially entirely the top section 16 of the hat 10. Accordingly, the first edge is connected, typically sewn, to a preferably rear portion of the edge 22 of the top section 16. The second free edge 28 of the first fabric member 18 is adjacent another preferably front portion of the top edge 22 to define the closable opening 32 there between.

While a specific embodiment has been described, those skilled in the art will recognize many alterations that could be made within the spirit of the invention, which is defined solely according to the following claims.

I claim:

1. A hat comprising:
   a generally planar top section, the top section having a top edge thereof;
   a fabric member having a first edge and a second free edge extending from the first edge and forming an outer perimeter of the fabric member therewith, the first edge connecting to a first portion of the top edge and defining a complementary second portion thereof unconnected to the fabric member, the second free edge being adjacent the second portion of the top edge and defining a closable opening between the second portion of the top edge and the second free edge, the fabric member and the top section defining an enclosure covering substantially entirely the top section; and
   an insect screen having a portion connectable to the top section or to the fabric member adjacent the closable opening, the insect screen being selectively insertable into the enclosure and deployable therefrom to cover a user's head.

2. The hat, according to claim 1, in which the insect screen is stuffable or foldable into the enclosure and deployable therefrom to cover the user's head.

3. The hat, according to claim, in which the insect screen is anti-mosquito netting.

4. The hat, according to claim 1, in which the top edge of the top section is circumferentially disposed.

5. The hat, according to claim 4, in which the first edge of the fabric member is arcuate and sewn to a rear portion of the circumferentially disposed top edge.

6. The hat, according to claim 1,in which the insect screen is releasably connected to the top section or to the fabric member adjacent the closable opening.

7. The hat, according to claim 1, in which the insect screen is stitched to the top section or to the fabric member adjacent the closable opening.

8. The hat, according to claim 1, in which the top section is generally elliptical.

9. The hat, according to claim 1, wherein the fabric member is a first fabric member, the hat further including;
   a second fabric member having a third edge and a fourth free edge, said third edge connecting to the second portion of the top edge, the second and fourth free edges being adjacent to one another and defining the closable opening therebetween, the first and second fabric members and the top section together defining the enclosure;
   the insect screen having a portion connectable to the top section, to the first fabric member or to the second fabric member adjacent the closable opening.

10. The hat, according to claim 9, in which the top edge of the top section is circumferentially disposed.

11. The hat, according to claim 10, in which the first edge of the first fabric member is arcuate and sewn to a rear portion of the circumferentially disposed top edge.

12. The hat, according to claim 10, in which the third edge of the second fabric member is arcuate and sewn to a front portion of the circumferentially disposed top edge.

13. The hat, according to claim 10, in which the first fabric member is larger than the second fabric member, the first fabric member end the top section defining a first enclosure part larger than a second enclosure part defined by the second fabric member and the top section, the insect screen being substantially insertable into the first enclosure part.

14. The hat, according to claim 9, in which the second and fourth free edges are overlapping edges so as to close the opening therebetween.

15. The hat, according to claim 14, in which the fourth edge overlaps the second edge, the first and second fabric members being generally disposed flat against the top section.

16. The hat, according to claim 9, in which the insect screen is stuffable or foldable into the enclosure and deployable therefrom to cover the user's head.

17. The hat, according to claim 9, further including a brim extending substantially radially all around a user's head, the brim being coverable by the insect screen when the screen covers the user's head.

18. The hat, according to claim 9, in which the insect screen is releasably connected to the top section, to the first fabric member or to the second fabric member adjacent the closable opening.

19. The hat, according to claim 9, in which the insect screen is stitched to the top section, to the first fabric member or to the second fabric member adjacent the closable opening.

20. The hat, according to claim 9, in which the insect screen is anti-mosquito netting.

* * * * *